United States Patent
Pavel et al.

(10) Patent No.: US 8,931,769 B2
(45) Date of Patent: Jan. 13, 2015

(54) DEVICE AND METHOD FOR DEBLOCKING OPTICAL WORKPIECES, IN PARTICULAR SPECTACLE LENSES

(75) Inventors: Gregor Pavel, Hüttenberg (DE); Thorsten Kraft, Wetzlar (DE); Holger Schäfer, Weilmünster (DE)

(73) Assignee: Satisloh AG, Baar (CH)

( * ) Notice: Subject to any disclaimer, the term of this patent is extended or adjusted under 35 U.S.C. 154(b) by 360 days.

(21) Appl. No.: 13/500,311

(22) PCT Filed: Aug. 14, 2010

(86) PCT No.: PCT/EP2010/005006
§ 371 (c)(1),
(2), (4) Date: May 3, 2012

(87) PCT Pub. No.: WO2011/042091
PCT Pub. Date: Apr. 14, 2011

(65) Prior Publication Data
US 2012/0205847 A1    Aug. 16, 2012

(30) Foreign Application Priority Data
Oct. 7, 2009 (FR) ........................ 10 2009 048 590.2

(51) Int. Cl.
*B23Q 3/00* (2006.01)
*B24B 13/005* (2006.01)
(52) U.S. Cl.
CPC ................................. *B24B 13/0057* (2013.01)
USPC ............................ 269/13; 269/20; 269/289 R (58) Field of Classification Search
USPC .......................................... 269/13, 20, 289 R
See application file for complete search history.

(56) References Cited

U.S. PATENT DOCUMENTS

| 4,502,909 A * | 3/1985 | Tomesko ....................... 156/356 |
| 8,141,220 B2 | 3/2012 | Guardia Aura |
| 2008/0132157 A1* | 6/2008 | Schneider et al. ............ 451/390 |
| 2008/0282855 A1 | 11/2008 | Kanai |
| 2010/0170635 A1* | 7/2010 | Savoie ........................ 156/275.5 |
| 2011/0033615 A1 | 2/2011 | Breme et al. |
| 2011/0067628 A1 | 3/2011 | Savoie et al. |
| 2011/0102739 A1 | 5/2011 | Lefort et al. |
| 2011/0220018 A1 | 9/2011 | Schafer et al. |
| 2013/0061462 A1* | 3/2013 | Geurts et al. ..................... 29/700 |

FOREIGN PATENT DOCUMENTS

WO    WO 03/018253 A1    3/2003

* cited by examiner

*Primary Examiner* — Lee D Wilson
*Assistant Examiner* — Shantese McDonald
(74) *Attorney, Agent, or Firm* — Reising Ethington P.C.

(57) ABSTRACT

The invention relates to a deblocking device and an associated method for deblocking optical workpieces, for example, eyeglass lenses. The deblocking device has a first moving apparatus for rotating a workpiece blocked on a block piece about a workpiece rotational axis, a nozzle assembly having a nozzle for discharging a high-pressure pressure medium jet in a direction substantially perpendicular to the workpiece rotational axis onto an edge area between the workpiece and block piece, and a second moving apparatus for generating a relative motion between the workpiece and the nozzle along the workpiece rotational axis.

21 Claims, 3 Drawing Sheets

DEVICE AND METHOD FOR DEBLOCKING OPTICAL WORKPIECES, IN PARTICULAR SPECTACLE LENSES

TECHNICAL FIELD

The present invention relates generally to a device for deblocking optical workpieces, for example, spectacle lenses, as well as to such a method.

BACKGROUND OF THE DISCLOSURE

In the manufacture of optical products "block mounting" or, for short, "blocking" generally denotes the process in which an optical workpiece is temporarily fastened on a so-called "block piece" by a suitable material (low-melting-point alloy or adhesive) or, however, the blocking material is mounted on the workpiece in order itself to form the block piece, which then serves the purpose of holding the workpiece in the respective processing machine and/or coating installation. Correspondingly, in manufacture of optical products "deblocking" defines that process in which the optical workpiece after processing and/or coating thereof is again separated from the block piece or blocking material.

The invention relates particularly to a device and a method for deblocking spectacle lenses. Spectacle lenses are blocked en masse in so-called "RX workshops" before the individual blocked spectacle lens is subjected, at its back or front surface with respect to its optical effect and/or at the edge for fitting in an associated spectacles frame, to machining by a geometrically defined cutter, e.g. milling or turning, or geometrically undefined cutter, e.g. grinding or polishing and/or is coated on its back or front surface in order to achieve additional effects, for example increase in scratch resistance, anti-reflection properties, vapor deposition, or hydrophobic characteristics.

If in the following reference is generally made in connection with the present invention to "spectacle lenses" as preferred field of use then there are to be understood by that optical lenses or lens blanks for spectacles from customary materials, such as polycarbonate, mineral glass, CR 39, HI Index, etc., and with any beginning shape of the circumferential edge of the lens or the lens blank, which prior to blocking can already have been—but does not have to be—subjected to pre-processing or pre-coating at one optically effective surface or both optically effective surfaces or at the edge. In addition, the spectacle lens can be provided on its surface at which it is or will be blocked with a film, a lacquer or the like in order to protect this surface from contamination and damage and/or to improve the adhesion characteristics between spectacle lens and blocking material, without this actually being specified hereinbelow.

There is no lack of proposals in the prior art with regard to how a device for automated deblocking of spectacle lenses can be constructed, in which connection a pressure medium, for example, water is employed in order to detach the spectacle lens from the block piece by application of hydraulic force and, in particular, either from inside by way of a pressure medium channel in the block piece, which opens at the blocking surface of the block piece facing the spectacle lens (e.g. DE 10 2005 038 063 A1, FIG. 13; WO 03/018253 A1, FIG. 4) or from outside by use of a high-pressure water jet which is issued by a nozzle and which impinges on an edge location between block piece and spectacle lens (for example WO 2008/003805 A1, FIG. 1).

A disadvantage of the inside application of the hydraulic forces is to be seen in that the block piece is provided with cavities which are open towards the blocking surface and which stand in the way of a desirable whole-area support of the spectacle lens at the block piece. In principle, the opening in the blocking surface can indeed be reduced in order to achieve an approximately whole-area support, but then it is barely possible to apply the hydraulic forces in order to separate the spectacle lens from the block piece.

Help can admittedly be created here through the use of a small piston in the separate block piece, which adjoins the blocking surface, as proposed as an alternative in WO 03/018253 A1 as shown in FIGS. 14 to 22. However, during the deblocking, mechanical forces are then applied by way of this piston to a relatively small central area at the spectacle lens, which can have the consequence of destroying the spectacle lens. It is at least necessary for the detaching to generate forces which are higher than the adhesion forces between spectacle lens and block piece. In the case of the aforedescribed piston solution the separating forces act on the center of the spectacle lens, whereas the adhesion forces primarily act in an annular zone at the spectacle lens edge. Particularly in the case of thin spectacle lens this can have the consequence of comparatively strong deformations and high levels of stress in the spectacle lens to be deblocked, which ultimately can produce fracture of the spectacle lens, quite apart from the outlay involved in providing such a piston in the block piece.

The previously known outside solution according to WO 2008/003805 A1, does indeed enable whole-area support of the spectacle lens at the block piece and additionally reduces the risk of damage of the spectacle lens during deblocking. However, this prior art is in need of improvement in another respect.

The deblocking method disclosed there was developed specifically for deblocking spectacle lenses blocked by a thermoplastic blocking material. In that case melting of the blocking material is initially imposed by immersing the composite of spectacle lens, blocking material and block piece in a bath with hot water. Block piece and blocking material as well as a protective film on the spectacle lens are then detached from the spectacle lens by a high-pressure water jet. For that purpose the water for the jet is heated to a temperature of between 50° C. and 65° C. in order to re-soften the blocking material and ultimately liquefy it as a consequence of the heating. The high-pressure water jet here fans out relatively widely and is in addition rotated about the longitudinal axis of the nozzle in order to also pass under the protective foil on the rotating spectacle lens and lift this off the spectacle lens.

A disadvantage of this prior art is to be seen particularly in that—also a consequence of the intermediate preheating step in the hot water bath—the deblocking of a spectacle lens takes a relatively long time, which represents an obstacle to efficient use of this method in RX workshops.

What is needed is a device for deblocking optical workpieces, particularly spectacle lenses, by which the optical workpieces can be deblocked as safely, free of damage and rapidly as possible. What is also needed is a corresponding deblocking method.

SUMMARY OF THE INVENTION

According to one aspect of the invention, a device for deblocking optical workpieces, particularly spectacle lenses, has a first movement device for rotating a workpiece, which is blocked on a block piece, about a workpiece axis of rotation, a nozzle subassembly with a nozzle for delivery of a high-pressure jet of pressure medium in a direction substantially transverse to the axis of rotation of the workpiece onto an edge region between workpiece and block piece and a second movement device for producing a relative movement between the workpiece and a nozzle along the axis of rotation of the workpiece. The workpiece is displaceable with respect to the nozzle or conversely the nozzle is displaceable with respect to the workpiece by the second movement device along the axis of rotation of the workpiece with positional regulation (Y-axis) so that the high-pressure jet of pressure medium can be oriented to a predetermined place of incidence in the edge region between workpiece and block piece.

In accordance to another aspect of the invention, a method provides deblocking of optical workpieces, particularly spectacle lenses, with use of the device by the following steps:
(i) placing a workpiece, which is blocked on the block piece, in the device so that the block piece is mounted to be rotatable by the first movement device about the axis of rotation of the workpiece,
(ii) calculating a relative position of the nozzle with respect to the block piece S, in which the nozzle is aimed at the predetermined place of incidence in the edge region between workpiece and block piece,
(iii) setting the calculated relative position of nozzle and block piece, e.g. the Y-axis by the second movement device,
(iv) switching on a high-pressure jet of pressure medium which is issued by the nozzle in the direction of the predetermined place of incidence in the edge region between workpiece and block piece in order to separate the workpiece from the block piece,
(v) switching off the high-pressure jet of pressure medium after the workpiece has separated or detached from the block piece and
(vi) removing the deblocked workpiece from the device.

Due to the fact that the high-pressure jet of pressure medium by contrast with the prior art defining the category is no longer incident or incident less by chance on the separating point between block piece and blocking material or the separating point between blocking material and workpiece, but as a consequence of the relative (height) adjustability e.g. height of nozzle and block piece can be directed selectively onto the respective separating point with CNC technology it is possible to significantly more quickly deblock the workpiece, which predestines the device/method according to the invention particularly for use in RX workshops. In this regard, a rapid deblocking process can be beneficially operated with a relatively high pressure of the pressure medium without a risk of the workpiece being damaged by the high-pressure jet of pressure medium, because due to the capability of selective movement to the relative setting of nozzle and block piece or workpiece it is possible to avoid scanning of the workpiece in a critical manner by the high-pressure jet of pressure medium. Thus, workpieces blocked by, in particular, adhesives can be deblocked rapidly, safely and free of damage without needing advance soaking and/or softening procedures and/or temperature-controlled pressure medium for the deblocking.

For concrete realization of the above deblocking method in an automated sequence it is preferable if the steps (ii) and (iii) include calculation or setting (Y-axis) of a height position of the nozzle with respect to a reference point, which is already known from the blocking process, at the block piece in order to aim with the nozzle at the predetermined place of incidence in the edge region between workpiece and block piece. A special measurement of the blocked workpiece or the like for determination of the separating locations to be targeted by the high-pressure jet of pressure medium is thus superfluous.

If a layer of blocking material is present between the workpiece and the block piece the predetermined place of incidence of the high-pressure jet of pressure medium can in principle lie at the separating point between workpiece and blocking material. However, it is preferable if the predetermined place of incidence of the high-pressure jet of pressure medium lies in the boundary region between block piece and blocking material, since mathematical calculation of the height position of the nozzle with respect to the block piece is simpler than with respect to the workpiece, which can also be "three-dimensionally" blocked on the block piece, for example with prismatic displacement.

The first movement device is preferably a motor spindle comprising having a collet chuck for reception, with orientation with respect to rotational angle, of the block piece, wherein the collet chuck is drivable to rotate about the axis of rotation of the workpiece by the motor spindle with rotational angle regulation (B axis). On the one hand, in the above step (iv) the block piece can thus be rotated by the first movement device about the axis of rotation of the workpiece, which accelerates the deblocking process by comparison with a—basically still possible—deblocking process with block piece held to be secure against rotation. On the other hand, it is thus possible in the above step (iv) to additionally calculate the height position of the nozzle with respect to the reference point at the block piece in dependence on the respective angular position of the block piece and to set or adjust it by the second movement device (Y-axis) so that the high-pressure jet of pressure medium is incident, not just at the start of the actual deblocking, but constantly in the boundary region between block piece and blocking material, this being a measure which further increases the precision and speed of the deblocking.

In a more advantageous and economic embodiment of the deblocking device the second movement device includes a Y-carriage which is displaceable by a servomotor and a threaded drive along the axis of rotation of the workpiece with positional regulation (Y-axis) and which carries the first movement device, i.e. the motor spindle.

In further pursuance of the concept of the invention a third movement device can be provided for producing a positionally regulated (X-axis) relative movement between the workpiece and the nozzle in a direction substantially perpendicular to the axis of rotation of the workpiece, wherein a clear spacing is settable between the nozzle and the predetermined place of incidence of the high-pressure jet of pressure medium by the third movement device. Thus, the spacing of nozzle and place of incidence can be optimized in simple manner with respect to a best possible (i.e. fast and reliable) deblocking result. The third movement device can—again in a more advantageous and economic embodiment—comprise an X-carriage which is displaceable by a servomotor and a threaded drive substantially perpendicularly to the axis of rotation of the workpiece with positional regulation (X-axis) and which carries the nozzle.

Thus, in an automated sequence of the deblocking method the steps (ii) and (iii) can further include calculation, or a setting (X-axis) carried out by the third movement device, of a radial position of the nozzle with respect to the reference point at the block piece in order to space the nozzle in defined manner from the predetermined place of incidence in the edge region between workpiece and block piece.

It is also possible in this case to additionally calculate the radial position of the nozzle with respect to the reference point at the block piece in dependence on the respective angular position of the rotating block piece in the above step (iv) and to set or adjust it by the third movement device (X-axis) so that the high-pressure jet or pressure medium after leaving the nozzle always impinges on the place of incidence in the edge region between workpiece and block piece after covering a substantially constant path i.e. clear spacing.

Tests carried out by the applicant with a fan nozzle, which is available on the market and has a nozzle opening cross-section of approximately 0.45 millimeters and a jet angle of approximately 25°, in which tests were undertaken with a pressure-medium high-pressure jet—formed from non-temperature-controlled tap water as pressure medium—and with a water pressure between 100 and 140 bars, preferably 120 bars, have in this connection shown that the clear spacing between the nozzle and the predetermined place of incidence of the high-pressure jet of pressure medium should lie between 15 millimeters and 40 millimeters, preferably at approximately 20 millimeters, in order to achieve a certain and rapid deblocking process. If the clear spacing is here too small, the blocking material is detached only in the center of the fanned-out high-pressure jet, whereagainst if the clear spacing is selected to be too large, this substantially increases the deblocking time.

In a further advantageous embodiment of the deblocking device the nozzle can be mounted on a pivot bearing of the nozzle subassembly to be pivotable about an angle setting axis so that a setting angle of the nozzle with respect to a plane perpendicular to the axis of rotation of the workpiece is adjustable. The tests carried out have here shown that the setting angle of the nozzle with respect to the plane perpendicular to the axis of rotation of the workpiece should lie between 5° and 25°, preferably at approximately 15°. In this regard, the high-pressure jet can either be inclined in the direction of the block piece, which enables deblocking even of workpieces having a smaller diameter than the block piece, or, however, inclined away from the block piece, which during deblocking generates at the workpiece a force component which is directed away from the block piece and to that extent promotes separation of workpiece and block piece.

It is further preferred if the deblocking devices comprises a suction device with a suction head which serves the purpose of holding the workpiece, during deblocking from the block piece, at its second optically effective surface facing away from the block piece. The suction head of the suction device can thus hold the workpiece at least in the above steps (iv) and (v), which further reduces the risk of damage of the workpiece during deblocking.

In a further advantageous embodiment of the deblocking device the suction head aligned with the axis of rotation of the workpiece is movable by a piston-cylinder arrangement in the direction of the axis of rotation of the workpiece (linear movement Y'), so that in the above step (iv) it is ultimately possible to still apply to the workpiece, a predetermined pulling force, by the piston-cylinder arrangement via the suction head sucking the second optically effective surface during the deblocking. This force advantageously is only slightly smaller than the retaining force produced at the workpiece by the suction head, this similarly being beneficial for a rapid deblocking process.

BRIEF DESCRIPTION OF THE DRAWINGS

The invention is explained in the following by way of preferred exemplifying embodiments with reference to the accompanying schematic drawings, wherein the same or corresponding subassemblies or parts are provided with the same reference numerals and further, for the sake of simplification of the illustration and enhanced clarity, subassemblies and parts not appearing necessary for an understanding of the invention were also omitted (such as control unit and control, casing parts, supply devices, inclusive of lines, hoses and pipes for current, compressed air and vacuum, etc.). In the drawings.

DETAILED DESCRIPTION OF THE EMBODIMENTS

Figure 1:
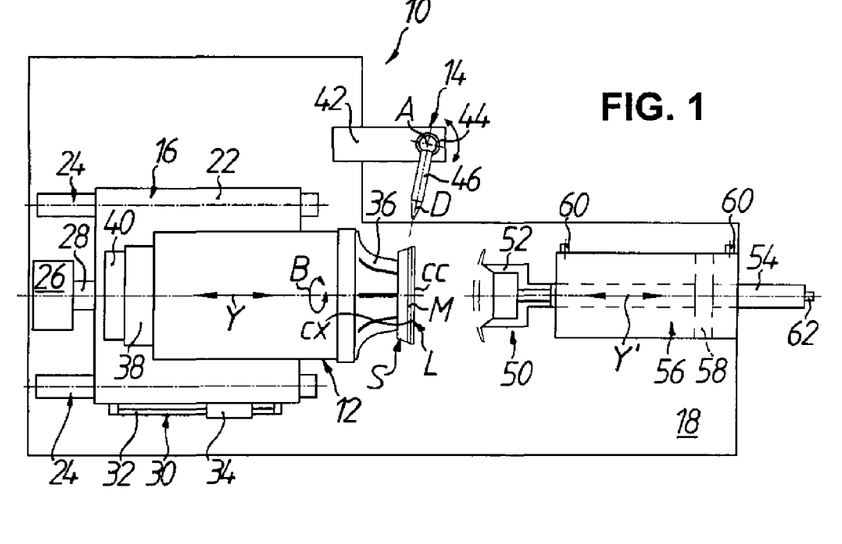
FIG. 1 shows a plan view of a device for deblocking spectacle lenses as optical workpieces according to a first embodiment of the invention, with a pivotable, but otherwise stationary, nozzle for issue of a deblocking high-pressure water jet as well as a rotational axis B, which is regulated with respect to angular positions, and a positionally regulated linear axis Y for the workpiece.
Figure 2:
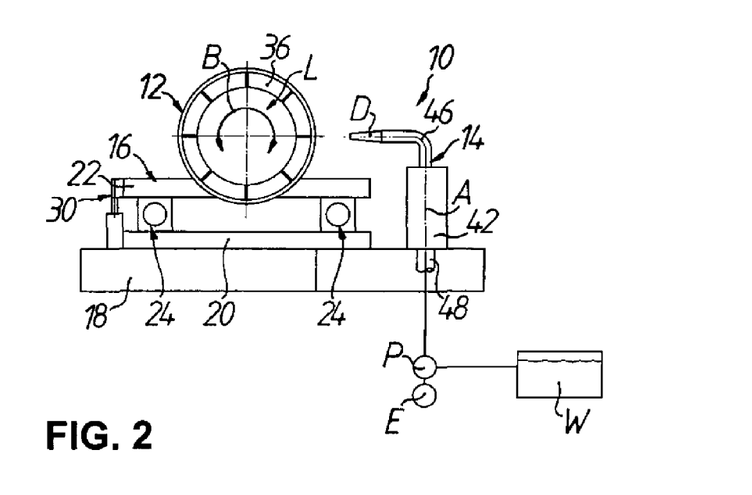
FIG. 2 shows a side view of the device according to FIG. 1 from the left in FIG. 1, which has been rotated in the drawing plane through 90° in clockwise sense.

In the first embodiment according to FIGS. 1 and 2 a device for deblocking spectacle lenses L as optical workpieces is denoted by 10. The deblocking device 10 comprises, in general terms, a first movement device 12 for rotating the spectacle lens L, which is blocked on a block piece S, about an axis B of workpiece rotation, a nozzle subassembly 14 with a nozzle D for delivery of a high-pressure water jet, for example, a pressure-medium high-pressure jet HDS illustrated in FIG. 5, in a direction substantially transverse to the axis B of workpiece rotation onto an edge region between spectacle lens L and block piece S, and a second movement device 16 for generating a relative movement between the spectacle lens L and the nozzle D along the axis B of workpiece rotation. It is significant that the spectacle lens L is displaceable with respect to the nozzle D—or, as an alternative (not illustrated) thereto, conversely the nozzle with respect to the spectacle lens—by the second movement device 16 along the axis B of workpiece rotation under positional regulation (Y-axis) so that the high-pressure water jet HDS can be directed onto a predetermined place MAP of incidence cf. again FIG. 5) in the edge region between spectacle lens L and block piece S, as will be explained in more detail in the following.

The deblocking device 10 is assembled as a whole on a base plate 18. Initially, a bracket 20 of the second movement device 16 is fastened on the base plate 18. A Y-carriage 22 or workpiece carriage of the second movement device 16 is mounted on the bracket 20 by way of two linear guides 24, which are arranged parallel and at a spacing from one another in transverse direction with respect to the axis B of workpiece rotation, to be longitudinally displaceable. Each linear guide 24 has, in a manner known per se, a guide rail or guide rod at one part e.g., bracket 20 or Y-carriage 22 and associated guide shoes at the other part. In order to generate the linear movement along the axis B of workpiece rotation, i.e. in the direction Y, the second movement device 16 has a servomotor 26 which is operatively connected with the Y-carriage 22 by way of a threaded drive 28. Arranged laterally of the Y-carriage 22 (at the left in FIG. 2) is a linear travel measuring system 30 with a linear measuring rod 32, which is fastened to the Y-carriage 22, and a reader head 34 associated therewith and mounted on the base plate 18 or the bracket 20. As a result, the Y-carriage 22 is linearly movable or adjustable relative to the bracket 20 and, in particular, with CNC positional regulation in both directions of the Y-axis, with the assistance of the position data ascertained by the travel measuring system 30, for the Y-carriage 22.

As FIG. 2, in particular shows, the Y-carriage 22 carries the first movement device 12, which in the illustrated embodiment is a roller-mounted motor spindle having a collet chuck 36 for reception, which is oriented with respect to rotational angle, of the block piece S. The motor spindle 12 rotationally drives the collet chuck 36, which can be constructed as described in DE 10 2008 051 833 A1 of the same applicant, in the rotational angle BAX (cf. FIG. 5) about the axis B of workpiece rotation with CNC regulation. In order to determine the angle position data required for that purpose a sleeve-shaft rotary encoder 38 is provided at the motor spindle 12. Finally, denoted here by 40a is a clamping release cylinder which actuates i.e. opens, the spring-biased collet chuck 36, in order to clamp or again release the block piece S.

In FIG. 1 the nozzle subassembly 14 is mounted on the base plate 18 above the collet chuck 36 by way of a mount 42. Fastened to the mount 42 is a pivot bearing 44 of the nozzle subassembly 14 which serves the purpose of mounting the nozzle D to be pivotable about an angle setting axis A so that a setting angle α of the nozzle D (cf., again, FIG. 5) with respect to a plane perpendicular to the axis B of workpiece rotation is adjustable. More specifically, the nozzle D, which as seen in the side view according to FIG. 2 is aimed at the axis B of workpiece rotation is attached to a tube 46 which is bent to be L-shaped and which in turn engages through the pivot bearing 44 and can be fixed therein in the set angular setting, for example by a clamping screw or the like (not illustrated). A high-pressure hose 48, which is hydraulically coupled with a high-pressure pump P, is connected with the tube 46. The high-pressure pump P is driven by an electric motor E in order to suck the pressure medium, here tap water not subject to temperature control, from a reservoir W and to convey it at a high water pressure of, for example, 120 bars to the nozzle D. A collecting pan for the water issued by the nozzle D and a return, which leads back to the reservoir, for this water are not shown here.

Whereas the spectacle lens L is blocked by its first optically effective surface cx by the blocking material M on the block piece S, as is explained in more detail with reference to FIG. 5, the second optically effective surface cc of the blocked spectacle lens L is disposed in the deblocking device 10 opposite a suction device 50. The suction device 50 comprises a suction head 52 with an encircling rubber lip which is aligned with the axis B of rotation of the workpiece and serves the purpose of holding the spectacle lens L at the second optically effective surface cc during deblocking from the block piece S. In FIG. 1 the spectacle lens L sucked against the suction head 52 is illustrated, after the deblocking, by dashed lines.

The suction head 52 is fastened to a piston rod 54, which has a through bore, of a piston-cylinder arrangement 56, which is similarly mounted on the base plate 18 and by which the suction head 52 is movable in the direction of the axis B of workpiece rotation (linear movement Y'), i.e. selectably to the left or the right in FIG. 1. For this purpose mounted on the piston rod 54 is a piston 58 which is illustrated in dashed lines in FIG. 1 and which can be acted on pneumatically at two sides, i.e. from the left and the right, in particular by way of corresponding compressed-air connections 60 of the piston-cylinder arrangement 56. A vacuum connection 62, by way of which the suction head 52 can be evacuated, is provided at the end of the piston rod 54 which is at the right in FIG. 1 and remote from the suction head 52. It will be apparent that a predetermined pulling force can be applied to the spectacle lens 11 by the piston-cylinder arrangement 56 via the suction head 52 sucking the second optically effective surface cc during deblocking.

Before, in particular, the geometric relationship between nozzle D and block piece S in the deblocking device 10 and the function of the deblocking device 10 for the first and second embodiments are described together in more detail with reference to FIG. 5, it shall firstly be explained how the blocking device 10 according to the second embodiment shown in FIGS. 3 and 4 differs from the preceding deblocking device 10 according to the first embodiment described with reference to FIGS. 1 and 2.

Figure 3:
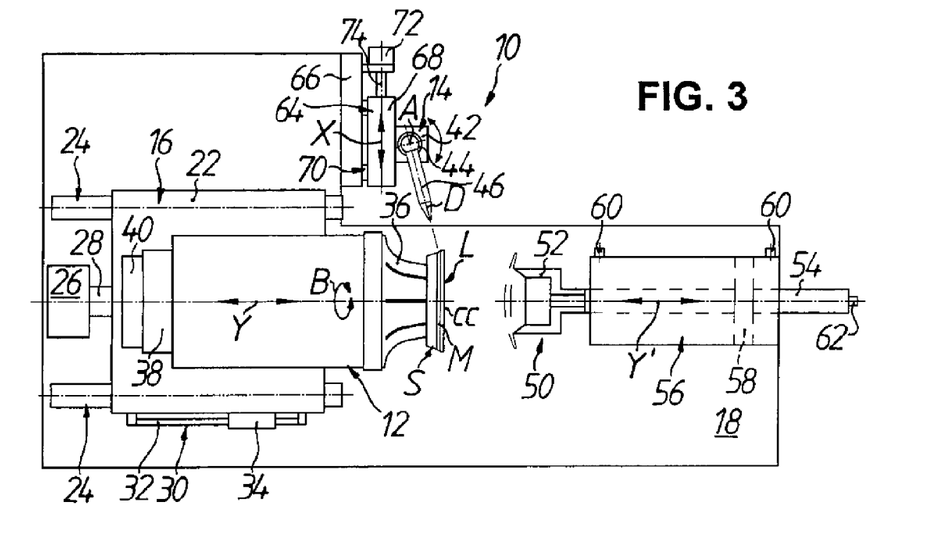
FIG. 3 shows a plan view of a device for deblocking spectacle lenses as optical workpieces according to a second embodiment of the invention, in which by comparison with the first embodiment a positionally regulated linear axis X for the nozzle for issue of the deblocking high-pressure water jet is additionally provided.
Figure 4:
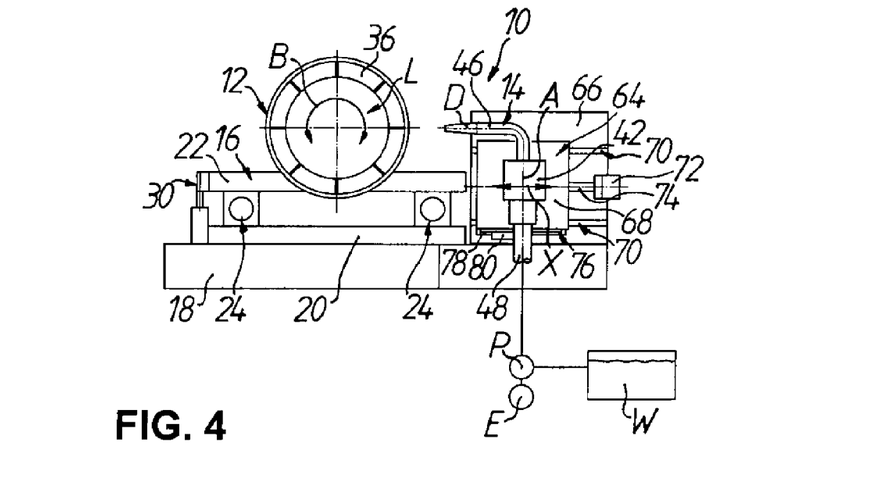
FIG. 4 shows a side view of the device according to FIG. 3 from the left in FIG. 3, which has been rotated in the drawing plane through 90° in clockwise sense.

The significant difference consists here in that in the case of the second embodiment illustrated in FIGS. 3 and 4 has the deblocking device 10 provided with a third movement device 64 for producing a positionally regulated (X-axis) relative movement between the spectacle lens L and the nozzle D in a direction substantially perpendicular to the axis B of workpiece rotation, which serves the purpose of setting in defined manner a clear spacing $a_d$ (see, again, FIG. 5) between the nozzle D—more specifically the outlet thereof—and the predetermined place MAP of incidence of the high-pressure water jet HDS.

In addition, the third movement device 64 has a bracket 66 which is attached to the base plate 18. An X-carriage 68 (nozzle carriage) of the third movement device 64 is mounted on the bracket 66 by way of two linear guides 70, which are arranged in parallel and spaced from one another in height direction in FIG. 4, to be longitudinally displaceable. Each linear guide 70 has in a manner known per se, a guide rail or guide rod at one part (bracket 66 or X-carriage 68) and associated guide shoes at the other part. In order to generate the linear movement substantially perpendicularly to the axis B of workpiece rotation, i.e. in the direction X, the third movement device 64 comprises a servomotor 72 which is flange-mounted on the bracket 66 and which is operatively connected with the X-carriage 68 by way of a threaded drive 78. Arranged below the X-carriage 68 (see FIG. 4) is a linear travel measuring system 76 with a linear measuring rod 78, which is fastened to the X-carriage 68, and a reader head 80, which is associated therewith and mounted on the bracket 66. In the end result, the X-carriage 68 is linearly movable or adjustable relative to the bracket 66 and, in particular, with CNC positional regulation in both directions of the X-axis, with the assistance of the positional data, which is ascertained by the travel measuring system 76, for the X-carriage 68. As FIGS. 3 and 4 finally show, the X-carriage 68 carries the mount 42 for the nozzle subassembly 14.

Figure 5:
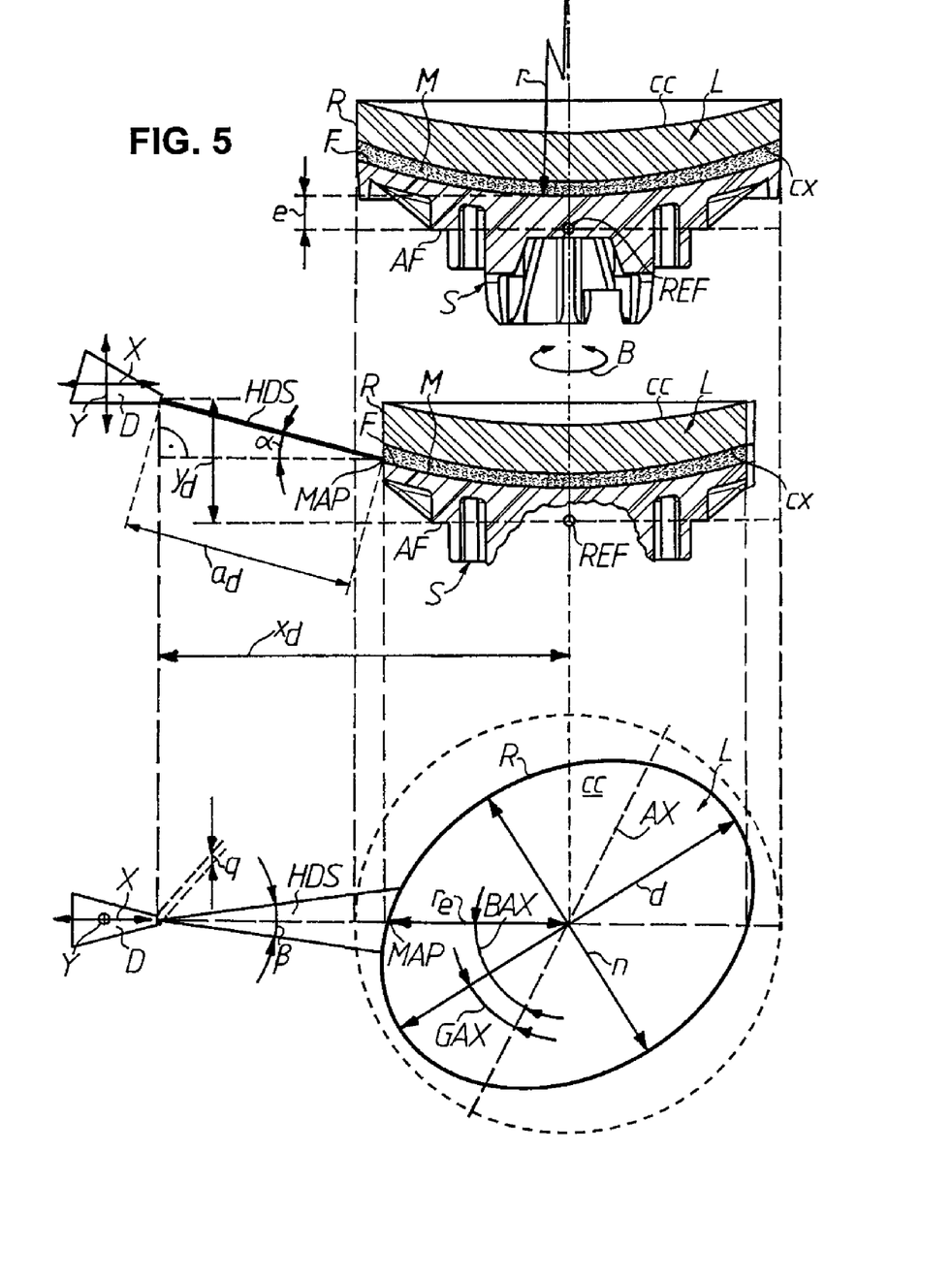
FIG. 5 shows a diagram for clarification of significant geometry data with respect to the nozzle for issue of the deblocking high-pressure water jet on the one hand and with respect to the composite of spectacle lens, blocking material and block piece on the other hand, as well as the geometric relative relationship of these parts to one another, also in a comparison between a state directly after blocking (sectional view at the top) and a state during deblocking (sectional view in the center and associated plan view at the bottom).

A blank of, for example, plastic material for a spectacle lens L, which is still not processed at its second optically effective surface cc or at its edge surface R and which is blocked by its first optically effective surface cx on the blocking surface F of the block piece S by the blocking material M, is now shown in the upper part of FIG. 5. The blocking material M is, for example, an adhesive mixture hardenable by ultraviolet light, such as is described in WO 2009/003660 A1 by which incorporated by reference is hereby made. The block piece S illustrated here similarly has a plastic material and is the subject of WO 2009/106296 A1 as well as of DE 2008 051 833 A1 of the same applicant, to which at this point incorporated by reference is hereby made with respect to the structure and function of the block piece S. With respect to a suitable blocking (block-mounting) method and a suitable blocking (block-mounting) device incorporation by reference is hereby made to WO 2009/135689 A1 of the present applicant.

The block piece S is illustrated in the upper part of FIG. 5 in a sectional view, wherein the sectional plane extends through an angle reference axis AX of the block piece S, which—in correspondence with German Standard DIN 58766—is defined by appropriate cut-outs at the block piece S and serves the purpose of orienting the block piece S in an associated mount or collet chuck (not illustrated here) in terms of angle about the axis B of workpiece rotation. The reference designation REF denotes in FIG. 5 a (high) reference point at the block piece S, at which the axis B or workpiece rotation intersects a plane containing an annular support surface AF of the block piece S, by which surface the block piece S bears against the associated mount or collet chuck (not shown here) so as to thus position the block piece S in the direction of the axis B of workpiece rotation, thus with respect to height. The block piece S has, referred to the reference point REF, a (minimum) height e at the point of the blocking surface F which is lowest in FIG. 5. The latter is, in the illustrated embodiment, a sphere with a predetermined radius r.

The blocked spectacle lens L is shown in the lower part of FIG. 5 after (slight) processing at its second optically effective surface cc and processing at its edge surface R, and, in particular, not only in section, but also in an associated plan view. In that case the spectacle lens L has been rotated relative to the illustration in the upper part of FIG. 5 through an angle of approximately 65° in counter-clockwise sense about the axis B of workpiece rotation, so that the angle reference axis AX has a different angular position.

As can be inferred from, in particular, the plan view of FIG. 5, in the illustrated example the spectacle lens L as a consequence of processing the edge surface R starting from an original circularly round circumferential profile of the blank (dotted line in the plan view) has gained an elliptical circumferential profile delineated here by a solid line. The thus-formed ellipse has a minor axis n and a major axis d, of which the latter includes with the angle reference axis AX of the block piece S a (fixed) angle GAX about the axis B of workpiece rotation. As the sectional view shows, during processing of the edge surface R of the spectacle lens L the block piece S was also machined in the edge region.

In addition, the relative position of the nozzle D with respect to the blocked spectacle lens L during deblocking of the spectacle lens L from the block piece S can be inferred from the lower part of FIG. 5. Here, firstly q and β denote the nozzle opening cross-section (q) at the outlet opening of the nozzle D and the angle (β) of jet fanning of the pressure-medium high-pressure jet HDS issued by the nozzle D. The point of incidence (or place of incidence), which is substantially medial with respect to the jet fanning of the pressure-medium high-pressure jet HDS, of the high-pressure jet HDS of pressure medium on the composite of spectacle lens L, blocking material M and block piece S is characterized by MAP. The mean point MAP of incidence of the high-pressure jet HDS of pressure medium is spaced in radial direction from the axis B of workpiece rotation by the (variable) ellipse radius $r_e$, the size of which obviously changes as a function of the rotational angle setting of the spectacle lens L or the block piece F about the axis B of workpiece rotation. Denoted by BAX is the (variable) angle which the ellipse radius $r_e$ includes at the central point MAP of incidence of the high-pressure jet of pressure medium HDS with the angle reference axis AX of the block piece S. Expressed in different terms, the ellipse radius $r_e$ is dependent on the respective rotational setting of the block piece S about the axis B of workpiece rotation, i.e. on the respective angle BAX [thus $r_e$=f(BAX)].

The relative position of nozzle D and blocked spectacle lens L in the deblocking device 10 is now defined by the adjustment angle or setting angle α of the nozzle D, i.e. of the pressure-medium high-pressure jet HDS, which it issues, with respect to a plane perpendicular to the axis B of workpiece rotation, the (radial) spacing $x_d$ of the outlet opening of the nozzle d from the reference point REF at the block piece S in X-direction and the (height) spacing $y_d$ of the outlet opening of the nozzle D from the reference point REF at the block piece S in Y-direction.

The setting angle α of the nozzle D should be fixedly preset to lie between 5° and 25°, wherein a smaller angle is better for flat curves (=larger radius r of the blocking surface F) and a larger angle for steep curves (=smaller radius r of the blocking surface F). The setting angle α of the nozzle D is preferably approximately 15°, which in tests carried out by the applicant proved to be a good compromise for a typical curve range.

The radial spacing $x_d$ of the outlet opening of the nozzle D from the axis B of workpiece rotation can be fixedly preset, as in the case of the first embodiment according to FIGS. 1 and 2, in which no X-axis is provided. If, for example, spectacle lenses L with a (maximum) diameter (d) between 50 millimeters and 90 millimeters are to be deblocked then the nozzle D is set to a fixed spacing $x_d$ of preferably approximately 65 millimeters from the axis B of workpiece rotation, which in tests carried out by the applicant led to good results. In principle, the radial spacing $x_d$ from the axis B of workpiece rotation should be set so that the clear spacing $a_d$ (see FIG. 5) between the outlet opening of the nozzle D and the mean point MAP of incidence of the high-pressure jet of pressure medium HDS on the composite of spectacle lens L, blocking material M and block piece S lies between 15 millimeters and 40 millimeters; the clear spacing $a_d$ should preferably here be approximately 20 millimeters.

If the high-pressure jet HDS of pressure medium is in terms of height incident in the boundary region between block piece S and blocking material M at the edge of the composite of spectacle lens L, blocking material M and block piece S, which is preferred, then the relative Y-position of the nozzle D (spacing $y_d$) with respect to the reference point REF at the block piece S can, for a fixed relative X-position of the nozzle D (constant spacing $x_d$), be calculated in accordance with the following equations:

$$y_d = r - \sqrt{r^2 - r_e^2} + e + \tan\alpha \cdot (x_d - r_e),$$

with the ellipse radius $r_e$ of $$r_e = \sqrt{\left(a \cdot \cos\left(\arctan\frac{a \cdot \sin w}{b \cdot \cos w}\right)\right)^2 + \left(b \cdot \sin\left(\arctan\frac{a \cdot \sin w}{b \cdot \cos w}\right)\right)^2},$$

wherein $$a = \frac{d}{2}, b = \frac{n}{2} \text{ and } w = BAX - GAX.$$

If, thereagainst, an adjustment possibility in the direction X is also provided as in the case of the second embodiment according to FIGS. 3 and 4 with an X-axis, then the nozzle spacings $x_d$ and $y_d$ with respect to the reference point REF at the block piece S with the ellipse radius $r_e$ are determined from the above formula and the desired clear spacing $a_d$ of nozzle D and point MAP of incidence (e.g. $a_d$=20 millimeters), in accordance with the following equations:

$$x_d = r_e + \Delta x_d,$$

wherein $$\Delta x_d = a_d \cdot \cos \alpha,$$

and $$y_d = r - \sqrt{r^2 - r_e^2} e + \tan \alpha \cdot \Delta x_d.$$

In principle, it is possible to calculate the relative nozzle position ($y_d$ and optionally $x_d$) prior to the actual deblocking process (1.) for a given angle position (BAX) of the spectacle lens L or of the block piece S with respect to the axis B of workpiece rotation in accordance with the above equations, (2.) to move up through CNC technology by adjustment in the Y-axis and optionally the X-axis, and maintain this during the actual deblocking process (3.), wherein then the block piece S with the spectacle lens L is rotated about the axis B of workpiece rotation. However, it is preferred to change the relative nozzle position ($y_d$ and optionally $x_d$) during the actual deblocking process (3.') in dependence on the respective angular position (BAX) of the spectacle lens L or block piece S with respect to the axis B of workpiece rotation and, in particular, by CNC technology movement in the Y-axis and optionally the X-axis during rotation of the spectacle lens L, so that as a consequence of co-ordinated movement in the B-axis, Y-axis and optionally X-axis the high-pressure jet HDS of pressure medium is always incident in terms of height in the boundary region between block piece S and blocking material M [i.e: $y_d$=f(BAX)] after covering the optionally always constant path $a_d$ from the outlet opening of the nozzle D to the point MAP of incidence [optionally: $x_d$=f(BAX)].

Good deblocking speeds were achieved in tests performed by the applicant with use of a market-available fan nozzle of the company Kärcher, which had a nozzle opening cross-section q of approximately 0.45 millimeters and a jet angle β of approximately 25°, with use as pressure medium of tap water without temperature control and with a water pressure of between 100 and 140 bars, preferably 120 bars. In this regard the fan nozzle was so mounted with respect to its rotational angle orientation about the longitudinal axis thereof that, as can be seen at the bottom in FIG. 5, the fanning-out of the high-pressure jet HDS of pressure medium in a viewing direction parallel to the axis B of workpiece rotation (plan view in FIG. 5) was complete ("triangle" with 25° lateral side angle), but in a viewing direction perpendicular to the axis B of workpiece rotation (middle sectional view in FIG. 5) was not at all recognizable (line).

The principal steps of a deblocking method, which was carried out with the afore-described deblocking device 10 (first or second embodiment) for spectacle lenses L can now be summarized as follows:
(i) placing a spectacle lens L, which is blocked on a block piece S, in the deblocking device 10 so that the block piece S is mounted to be rotatable by the first movement device (motor spindle 12) about the axis B of rotation of the workpiece,
(ii) calculating a relative position of the nozzle D with respect to the block piece S, in which the nozzle D is aimed at the predetermined place MAP of incidence in the edge region between spectacle lens L and block piece S,
(iii) setting (Y-axis) by CNC technology of the calculated relative position of nozzle D and block piece S by the second movement device 16,
(iv) switching on the pressure-medium high-pressure jet HDS, which is issued by the nozzle D in the direction of the predetermined place MAP of incidence in the edge region between spectacle lens L and block piece S, so as to separate the spectacle lens L from the block piece S,
(v) switching off the pressure-medium high-pressure jet HDS after the spectacle lens L has separated from the block piece S and
(vi) removing the deblocked spectacle lens L from the deblocking device 10.

Bearing in mind the above explanations with respect to FIG. 5, in this regard the steps (ii) and (iii) in the two embodiments include calculation or CNC technological setting (Y-axis) of the height position $y_d$ of the nozzle D with respect to the reference point REF at the block piece S in order to aim with the nozzle at the predetermined place MAP of incidence in the edge region between spectacle lens L and block piece S.

In the second embodiment according to FIGS. 3 and 4 the steps (ii) and (iii) can further include calculation, or a CNC technological setting (X-axis) produced by the third movement device 64, of the radial position $x_d$ of the nozzle D with respect to the reference point REF at the block piece S so as to also space the nozzle D in defined manner from the predetermined place MAP of incidence in the edge region between spectacle lens L and block piece S (clear spacing $a_d$).

If in addition the block piece S is also rotated about the axis B of workpiece rotation by the first movement device (motor spindle 12) at least in step (iv) then it is preferred if in addition in step (iv) the height position $y_d$ of the nozzle D with respect to the reference point REF at the block piece S is calculated in dependence on the respective angular position BAX of the block piece S as described above and set or adjusted by the second movement device 16 (Y-axis) [i.e: $y_d$=f(BAX)], so that the high-pressure jet HDS of pressure medium always impinges in the boundary region between block piece S and blocking material M. This again relates to both embodiments.

In the second embodiment according to FIGS. 3 and 4 there is additionally the possibility in step (iv) of calculating the radial position $x_d$ of the nozzle with respect to the reference point REF at the block piece S in dependence on the respective angular position. BAX of the block piece S and setting or adjusting it by the third movement device 64 (X-axis) [thus: $x_d$=f(BAX)] so that the high-pressure jet HDS of pressure medium after departure from the nozzle D always impinges on the place MAP of incidence in the edge region between spectacle lens L and block piece S after covering a substantially constant path (clear spacing $a_d$ of preferably 20 millimeters).

If designed with further sub-steps, the entire deblocking process can be represented in a semi-automatic sequence as follows: Initially, a "job ticket" or a code provided at the block piece S ("data matrix"; not shown) is scanned in at the blocking device 10 in order to call up the processing parameters or the block piece state. Such parameters can comprise, in particular, the radius r of the blocking surface F of the respective block piece S and the height e thereof referred to the reference point REF, and in addition the geometry data of the processed, blocked spectacle lens L, which data are required for calculation of the ellipse radius $r_e$ if the block piece S was machined at the edge so that the edge of the block piece S differs from the original circular form with known diameter, namely the ellipse axes d and n as well as the angle GAX. The blocked spectacle lens is then placed in the deblocking device 10, i.e. clamped by the block piece S at the collet chuck 36 of the motor spindle 12.

After pressing the start button (not illustrated) an automatic step sequence then begins in which initially the door (not shown) of the deblocking device 10 is closed. The axis Y and optionally axis X then move into the calculated (start) position or positions as described above, whereupon the piston-cylinder arrangement 56 advances, i.e. the suction head 52 of the suction device 50 displaces in direction Y' to the left in FIG. 1 or 3 so that the rubber lip of the suction head 52 comes into contact with the second optically effective surface cc of the spectacle lens L.

Subsequently, a sub-atmospheric pressure is applied to the suction head 52 by way of the vacuum connection 62 so that the head firmly sucks the spectacle lens L. The piston-cylinder arrangement 56 is thereupon acted on pneumatically in such a manner that the piston 58 thereof seeks to draw the suction head 52 in the direction Y' to the right away from the spectacle lens L by way of the piston rod 54 in FIG. 1 or FIG. 3. However, this does not happen, because the pulling force applied to the spectacle lens L by the piston-cylinder arrangement 56 via the suction head 52 is set so that it is slightly less than the retaining force produced by the suction head 52 at the spectacle lens L.

The high-pressure jet HDS is then switched on, whilst the spectacle lens L is preferably rotated by way of the block piece S by the motor spindle 12. In order to follow this rotation the suction head 52 is equipped with an appropriate free wheel (not illustrated) with respect to the piston rod 54. As already described, the relative position between block piece S and nozzle D can now be set or adjusted by the second movement device 16 and optionally the third movement device 64 with rotational angle dependence in Y or X direction with the object of directing the high-pressure jet HDS always between the blocking material M and block piece S (Y-axis) and thereby optionally keeping the free jet length (clear spacing $a_d$) of the high-pressure jet HDS constant (X-axis).

If, as a consequence of the superimposed action of high-pressure jet HDS and pulling force at the spectacle lens L, the spectacle lens L with the blocking material M now separates from the block piece S then the piston rod 54 and thus the piston 58 of the piston-cylinder arrangement 56 can move further to the right in FIG. 1 or 3. The end position at the right in FIG. 1 or FIG. 3 of these parts is detected by a sensor (not shown) which issues a signal indicating that the spectacle lens L is deblocked from the block piece S.

The high-pressure jet HDS is then switched off and the axes (Y and optionally X) move back to their starting position. The door of the deblocking device 10 opens and spectacle lens L and block piece S can be removed separately. The blocking material M still adhering to the spectacle lens L can now be removed by hand from the first optically effective surface cx of the spectacle lens L. However, as an alternative thereto use can also be made of a further, rotating high-pressure jet in the deblocking device, which jet is issued by a nozzle (not illustrated), which is individually provided for that purpose, in order to "peel off" the blocking material from the spectacle lens.

Finally, a decision is still to be taken whether the block piece S after appropriate cleaning can be reused or, however, has to be discarded if, for example, it was machined at the edge.

A deblocking device and an associated method for deblocking optical workpieces, particularly spectacle lenses, have been disclosed. The deblocking device comprises a first movement device for rotating a workpiece, which is blocked on a block piece, about an axis of workpiece rotation, a nozzle subassembly with a nozzle for issuing a high-pressure jet of pressure medium in a direction substantially transverse to the axis of workpiece rotation onto an edge region between workpiece and block piece and a second movement device for generating a relative movement between the workpiece and the nozzle along the axis of workpiece rotation. A feature of the deblocking device is that the workpiece is preferably displaceable with respect to the nozzle by the second movement device along the axis of workpiece rotation with positional regulation (Y-axis) so that the high-pressure jet of pressure medium can be directed onto a specific place of incidence in the edge region between workpiece and block piece, particularly to accelerate deblocking.

Variations and modifications are possible without departing from the scope and spirit of the present invention as defined by the appended claims.

We claim:

1. A device for deblocking optical workpieces comprising:
    a first movement device for rotating a workpiece, which is blocked on a block piece, about an axis of rotation of the workpiece;
    a nozzle subassembly with a nozzle for delivery of a high-pressure jet of pressure medium in a direction substantially transverse to the axis of rotation of the workpiece onto an edge region between workpiece and block piece;
    a second movement device for producing a relative movement between the workpiece and the nozzle along the axis of rotation of the workpiece; and
    one of the workpiece and the nozzle being displaceable with respect to another by the second movement device along the axis of rotation of the workpiece with positional regulation so that the high-pressure jet of pressure medium can be oriented to a predetermined place of incidence in the edge region between workpiece and block piece.

2. A device according to claim 1 further comprising:
    the first movement device being a motor spindle having a collet chuck for reception, with orientation with respect to rotational angle, of the block piece; and
    the collet chuck being rotatably driven about the axis of rotation of the workpiece by the motor spindle with regulation of rotational angle.

3. A device according to claim 1 further comprising:
    the second movement device having a Y-carriage which is displaceable by a servomotor and a threaded drive along the axis of rotation of the workpiece with positional regulation and which carries the first movement device.

4. A device according to claim 1 further comprising:
    a third movement device for generating a positionally regulated relative movement between the workpiece and the nozzle in a direction substantially perpendicular to the axis of rotation of the workpiece, wherein a clear spacing between the nozzle and the predetermined place of incidence of the high-pressure jet of pressure medium is settable by the third movement device.

5. A device according to claim 4 further comprising:
    the third movement device having an X-carriage which is displaceable by a servomotor and a threaded drive substantially perpendicularly to the axis of rotation of the workpiece with positional regulation and which carries the nozzle.

6. A device according to claim 4 further comprising:
the clear spacing between the nozzle and the predetermined place of incidence of the high-pressure jet of pressure medium is between 15 millimeters and 40 millimeters.

7. A device according to claim 1 further comprising:
the nozzle being mounted on a pivot bearing of the nozzle subassembly to be pivotable about an angle setting axis so that a setting angle of the nozzle with respect to a plane perpendicular to the axis of rotation of the workpiece is adjustable.

8. A device according to claim 7 further comprising:
the setting angle of the nozzle with respect to the plane perpendicular to the axis of rotation of the workpiece being between 5° and 25°.

9. A device according to claim 1 further comprising:
the workpiece having a first optically effective surface and a second optically effective surface and prior to the deblocking being blocked by the first optically effective surface on a blocking surface of the block piece, wherein a suction device with a suction head is provided, which serves the purpose of holding the workpiece at the second optically effective surface during deblocking from the block piece.

10. A device according to claim 9 further comprising:
the suction head aligned with the axis of rotation of the workpiece being linearly movable by a piston-cylinder arrangement in the direction of the axis of rotation of the workpiece, wherein a predetermined pulling force can be applied to the workpiece by the piston-cylinder arrangement via the suction head sucking the second optically effective surface during the deblocking.

11. A device according to claim 1 further comprising:
the high-pressure jet of pressure medium issued by the nozzle during deblocking being formed from non-temperature-controlled tap water as pressure medium and having a water pressure between 100 and 140 bars.

12. A device according to claim 1 further comprising:
the nozzle being a fan nozzle with a nozzle opening cross-section (q) of approximately 0.45 millimeters and a jet angle ($\beta$) of approximately 25°.

13. A method of deblocking optical workpieces with use of a device having a first movement device for rotating a workpiece, which is blocked on a block piece, about an axis of rotation of the workpiece; a nozzle subassembly with a nozzle for delivery of a high-pressure jet of pressure medium in a direction substantially transverse to the axis of rotation of the workpiece onto an edge region between workpiece and block piece; a second movement device for producing a relative movement between the workpiece and the nozzle along the axis of rotation of the workpiece; and one of the workpiece and the nozzle being displaceable with respect to another by the second movement device along the axis of rotation of the workpiece with positional regulation so that the high-pressure jet of pressure medium can be oriented to a predetermined place of incidence in the edge region between workpiece and block piece; the method comprising the following steps:
(i) placing the workpiece, which is blocked on the block piece, in the device so that the block piece is mounted to be rotatable by the first movement device about the axis of rotation of the workpiece,
(ii) calculating the relative position of the nozzle with respect to the block piece, in which the nozzle is aimed at the predetermined place of incidence in the edge region between workpiece and block piece,
(iii) setting the calculated relative position of nozzle and block piece by the second movement device,
(iv) switching on the high-pressure jet of pressure medium which is issued by the nozzle in the direction of the predetermined place of incidence in the edge region between workpiece and block piece in order to separate the workpiece from the block piece,
(v) switching off the high-pressure jet of pressure medium after the workpiece has separated from the block piece and
(vi) removing the deblocked workpiece from the device.

14. A method according to claim 13, wherein the steps (ii) and (iii) comprise calculation and setting of a height position of the nozzle with respect to a reference point at the block piece in order to aim with the nozzle at the predetermined place of incidence in the edge region between workpiece and block piece.

15. A method according to claim 14, wherein the steps (ii) and (iii) further comprise calculation and setting carried out by the third movement device of a radial position of the nozzle with respect to the reference point at the block piece in order to space the nozzle in defined manner from the predetermined place of incidence in the edge region between workpiece and block piece by a clear spacing.

16. A method according to claim 13, wherein a layer of blocking material is disposed between the workpiece and the block piece and the predetermined place of incidence of the high-pressure jet of pressure medium lies in the boundary region between block piece and blocking material.

17. A method according to claim 13, wherein at least in the step (iv) the block piece is rotated by the first movement device about the axis of rotation of the workpiece.

18. Method according to claim 13, wherein in addition in step (iv) the height position of the nozzle with respect to the reference point at the block piece is calculated in dependence on the respective angular position of the block piece and set by the second movement device so that the high-pressure jet of pressure medium is always incident in the boundary region between block piece and blocking material.

19. A method according to claim 13, wherein in addition in step (iv) the radial position of the nozzle with respect to the reference point at the block piece is calculated in dependence on the respective angular position of the block piece and is set by the third movement device so that the high-pressure jet of pressure medium after departure from the nozzle is always incident at the place of incidence in the edge region between workpiece and block piece after covering a substantially constant path.

20. A method according to claim 13, wherein at least in steps (iv) and (v) the suction head of the suction device holds the workpiece at the second optically effective surface.

21. A method according to claim 13, wherein in step (iv) the piston-cylinder arrangement applies to the workpiece by way of the suction head of the suction device a pulling force which is only slightly smaller than the retaining force produced at the workpiece by the suction head.

* * * * *